United States Patent Office 3,632,830
Patented Jan. 4, 1972

3,632,830
PROCESS FOR THE PURIFICATION OF CRUDE BIS-(β-HYDROXYETHYL) TEREPHTHALATE
Yataro Ichikawa, Michiyuki Tokashiki, and Nobuo Suzuki, Iwakuni-shi, Japan, assignors to Teijin Limited, Osaka, Japan
Filed Dec. 3, 1968, Ser. No. 780,619
Int. Cl. C07c 69/82
U.S. Cl. 260—475 PR   6 Claims

ABSTRACT OF THE DISCLOSURE

A process for purifying crude bis-(β-hydroxyethyl) terephthalate prepared by the reaction of terephthalic acid or dimethyl terephthalate with ethylene glycol or ethylene oxide which comprises dissolving the crude bis-(β-hydroxyethyl) terephthalate in an aromatic solvent at a concentration higher than the saturation solubility of the crude bis-(β-hydroxyethyl) terephthalate in the solvent at a temperature corresponding to the apparent melting point of the same crude bis-(β-hydroxyethyl) terephthalate in the same solvent at an elevated temperature above the apparent melting point and rapidly cooling the solution to a temperature below the apparent melting point, thereby avoiding the precipitation of granular or blocky solids of bis-(β-hydroxyethyl) terephthalate.

---

Figure 1:
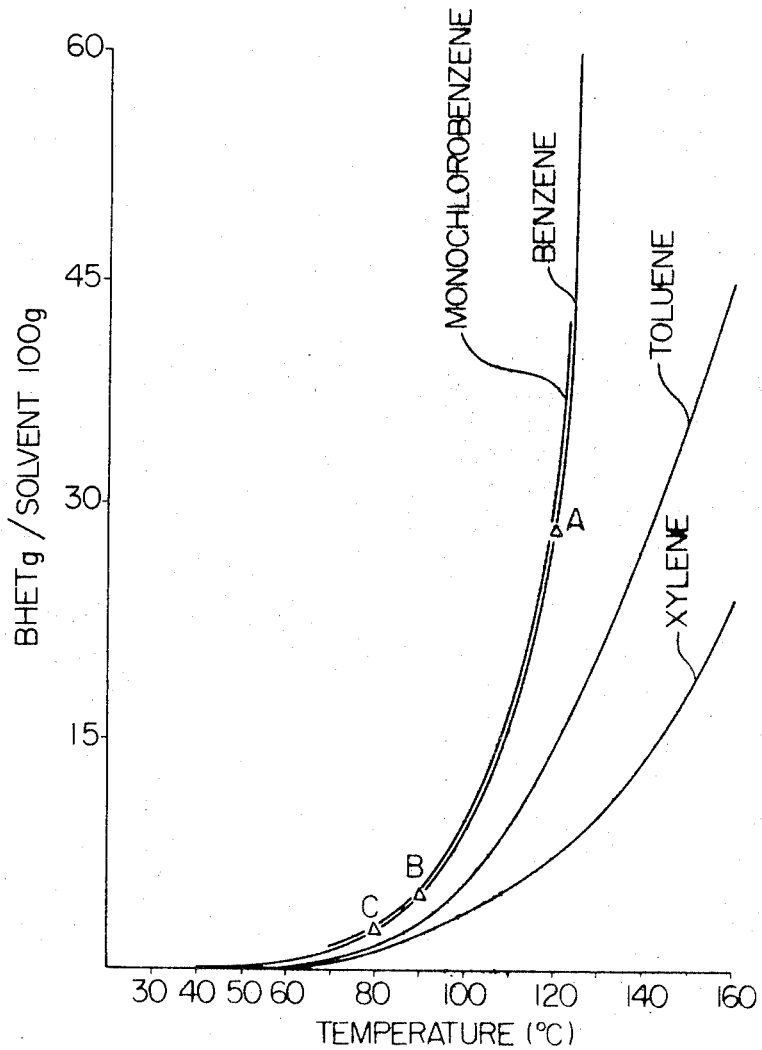

This invention relates to a process for the purification of crude bis-(β-hydroxyethyl) terephthalate.

Bis-(β-hydroxyethyl) terephthalate (which hereinafter will be abbreviated as BHET) is produced in large quantities as an intermediate product in the preparation of polyethylene terephthalate, and has high industrial value.

BHET is conventionally produced by ester-interchange between dimethyl terephthalate and ethylene glycol, or by direct esterification of terephthalic acid with ethylene glycol. Also recently, a method normally referred to as ethylene oxide method is drawing much attention in the field, in which terephthalic acid is directly reacted with ethylene oxide.

Crude BHET which is obtained by the foregoing methods contains various impurities such as those contained in the material terephthalic acid, catalyst employed in the BHET-forming reaction, additives, and impurities side-produced of the reaction. Some of these impurities apt to cause coloring, or lowering in melting point, of polyester or are detrimental to the polymerization reaction. Therefore, it is essential to eliminate such impurities from BHET to the maximum degree possible, in order to use the same as the starting material for high quality polyester.

More specifically, the impurities in crude BHET include reaction product of the impurities carried from the starting terephthalic acid or dimethyl terephthalate, for example, 4-carboxybenzaldehyde, with ethylene glycol or ethylene oxide

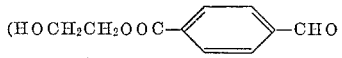

to be abbreviated as HE-4CBA); reaction product of p-toluic acid with ethylene glycol or ethylene oxide

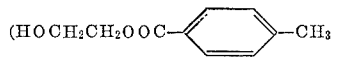

to be abbreviated as HE-PTA); lower condensation products of the foregoing with BHET; addition products of BHET and ethylene oxide side-produced of the reaction of terephthalic acid with ethylene glycol or ethylene oxide

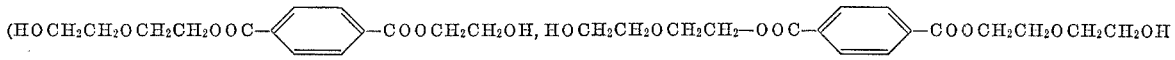

and lower condensation products between the foregoing, or those of the foregoing with BHET. (Those impurities containing ether linkages will be hereinafter abbreviated as Φ-DEG). Those impurities cause the following objectionable phenomena during the polyester production: i.e., HE-4CBA causes coloring of polyester; HE-PTA retards the rate of polymerization reaction of polyester; and Φ-DEG lowers the melting point of the product polyester.

The main object of the present invention is to provide a process for eliminating the impurities in crude BHET, particularly the aforesaid HE-4CBA, HE-PTA, and Φ-DEG, whereby providing high purity BHET suitable as the starting material of polyester.

Various purification methods of crude BHET have been proposed in the past. One of the typical of such methods is solvent recrystallization. As the solvents useful in that method, for example, U.S. Pat. No. 3,062,862 proposed water, and U.S. Pats. Nos. 3,120,560 and 3,268,575 proposed polar organic solvents, such as chlorinated hydrocarbon, alcohol, etc. Solubility of BHET in those solvents is extremely high, however, and even at low temperatures the solubility is still considerable. Consequently, when the solvent solution is cooled to low temperatures in the attempt to recover BHET from the solution, substantial quantities of BHET remains as dissolved in the solution. Thus, in order to recover that BHET, either the solution must be cooled to very low temperatures, or the solvent must be eliminated, by evaporation, completely or almost completely. Therefore those recrystallization solvents are hardly suitable for industrial use.

Also the use of non-polar solvents, such as aliphatic or cycloaliphatic hydrocarbons as the recrystallization solvents or BHET is known. However, solubility of BHET in such solvents is too low to justify their use on industrially practicable scale.

According to our experiments, it is discovered that when aromatic compounds which are liquid at room temperature, such as benzene, toluene and xylene, are used as the recrystallization solvent, solubility of BHET in those aromatic compounds is very low at relatively low temperatures such as room temperature, but very high at higher temperatures, such as 100° C. and above. Therefore, in respect of solubility of BHET alone, those aromatic compounds are suitable recrystallization solvents.

Our attempt to purify crude BHET by conventional recrystallization method using the aforesaid aromatic compounds which are liquid at room temperature, however, failed to produce BHET of satisfactory purity. Whereas, it is now discovered that, if the specific purification process of the invention is applied to the recrystallization with such aromatic compounds, the objectionable impurities can be very effectively removed, and that BHET which is quite satisfactory as the starting material for polyester can be obtained.

To wit, the present invention comprises the known purification method of crude BHET including the steps of:

(a) dissolving crude BHET, with heating, in an aromatic compound solvent which is liquid at room temperature,
(b) cooling the heated solution to precipitate the BHET, and
(c) separating the precipitated BHET, the improvement residing in that, in the above dissolving step (a), the solution is caused to contain crude BHET as uniformly dissolved therein, at a concentration higher than the saturation solubility of the crude BHET in the solvent at the temperature corresponding to the apparent melting point of the crude BHET in the solvent, said apparent melting point being defined in the specification, at an elevated temperature above the said apparent melting point, and in the above cooling step (b), at least the cooling from the above temperature of the solution to an optional temperature below the apparent melting point is performed rapidly, so as to avoid the precipitation of granular or blocky solid of the BHET.

As aforesaid, solubility of crude BHET in the aromatic compounds which are liquid to room temperature, such as benzene, toluene, xylene and monochlorobenzene, is relatively low at low temperatures, but it rapidly increases with the temperature rise. For example, solubilities of a high purity BHET melting at 110° C. in benzene, toluene, xylene, and monochlorobenzene at various temperatures are as given in the attached graph of FIG. 1.

As can be understood from the same graph, solubility of BHET in those liquid aromatic compounds rapidly increases with the temperature rise. Therefore, for practicing the purification at a high efficiency, it is advantageous to dissolve the maximum possible crude BHET at considerably high temperatures such as 100° C. or above, in such aromatic compound solvent, and to cool such a solution to the optional temperature such as room temperature or above, so that the maximum feasible quantity of purified BHET may be obtained by single purification operation.

According to our studies, the melting point of high purity BHET is 110°–111° C., but the apparent melting point of the same BHET in the system in which the aromatic compound is concurrently present is lower than the above temperature by approximately 5°–20° C. For example, the apparent melting points of the BHET in the typical aromatic compounds are as in Table 1 below.

TABLE 1

Melting points of BHET in the concurrent presence of various aromatic compounds (solvent)

| Aromatic compound: | Apparent melting point of BHET (° C.) |
|---|---|
| Benzene | 90–98 |
| Toluene | 91–100 |
| Xylene | 93–102 |
| Monochlorobenzene | 90–98 |

Furthermore, the apparent melting points of crude BHET containing minor quantities of impurities as above-described, in the concurrent presence of aromatic compounds as above, are still somewhat lower than the temperatures given in the above Table 1.

The apparent melting points of BHET in the liquid aromatic compounds can be measured, for example, in the manner as follows: one (1) g. of the sample BHET and 5 g. of solvent (an aromatic compound) are put in a sealed tube, and gradually heated in an oil bath. The temperature at which the sample BHET is molten (at which temperature two liquid phases are formed in the sealed tube) is measured as the apparent melting point.

Thus, in order to perform efficient purification operation using the liquid aromatic compound in accordance with this invention, a heated solution of crude BHET containing the solute at a concentration higher than the saturation solubility of the crude BHET in the aromatic compound at the temperature corresponding to the apparent melting point of the crude BHET in the same solvent, is formed, and it is then cooled so that the purified BHET may be precipitated.

However, according to our studies, when the above heated solution containing crude BHET is gradually cooled as conventionally practiced in the ordinary recrystallization method, the purity of the precipitated BHET is still unsatisfactory. That is, thus precipitated and separated BHET retains the greater portions of the impurities, and polyethylene terephthalate obtained by polymerizing that BHET is colored yellow to brown, and its melting point is lower than that of high purity polyethylene terephthalate by approximately 1°–5° C.

Accordingly, we pursued our studies further into the precipitation mechanism of the purified BHET. As the result we discovered that, when the above heated solution is rapidly cooled or quenched, at least from that high temperature to an optional temperature below the apparent melting point of the crude BHET in the solvent, so as to precipitate BHET substantially instantaneously, the precipitated BHET exhibits very high purity, and the polyethylene terephthalate polymerized of that BHET is completely free of coloring, or if colored, colored not more than substantially negligible degree. Also, the polyethylene terephthalate possesses the melting point as high as, or even higher than, that of commercial polyethylene terephthalate.

When the solution obtained by dissolving crude BHET in an aromatic compound solvent which is liquid at room temperature, for example, benzene, toluene, xylene or monochlorobenzene, by heating, is gradually cooled, blocky or granular solid BHET is precipitated, in case the solution contains, as uniformly dissolved therein, crude BHET in the quantity greater than that corresponding to the solubility thereof at the apparent melting point. (Of course the temperature of he solution is higher than the apparent melting point.)

In contrast thereto, for example, when the above heated solution is discharged into a low pressure zone so that the slurry system resulting from the rapid evaporation of a part or the most part of the solvent in the heated solution and partial precipitation of the BHET dissolved therein, is quenched to a temperature below the said apparent melting point of the crude BHET in the same solvent, the BHET precipitate consisting mainly of flaky or needle-like crystals is obtained. In that case, if the pressure in the low pressure zone is not sufficiently low, and furthermore the cooling is performed not rapidly enough, together with the flaky or needle-like crystals, granular or blocky BHET solid may be precipitated.

We minutely investigated those phenomena in correlation with the purity of the precipitated BHET, to discover the following:

(A) In case of precipitating BHET by cooling the solution of crude BHET which is heated to a temperature higher than the apparent melting point of the BHET, if the cooling is performed with insufficient rapidity, granular or blocky, solid BHET is precipitated.

(B) The analysis results of such grains or blocks of solid BHET indicate that they still contain considerable quantities of impurities such as HE-4CBA and Φ-DEG.

(C) Whereas, if the cooling is sufficiently rapid, the BHET precipitate is obtained mainly in the form of flaky or needlelike crystals, in mixture with minor quantity of amorphous BHET, but no granular or blocky BHET is contained.

(D) And, the BHET precipitate containing no granular or blocky BHET shows extremely low impurity content, and when it is polymerized, substantially coloration-free, high melting point polyethylene terephthalate can be obtained.

Furthermore, according to the invention, aromatic compounds which are liquid at room temperature are used as the solvent, and it is discovered that, when the solvent solution containing crude BHET as uniformly dissolved therein, at a concentration higher than the saturation solubility of the BHET in the solvent at the apparent melting point of the BHET in the solvent, said solution being heated to a temperature higher than said apparent melting point, is cooled from that temperature to an optional temperature which is, at highest, below the apparent melting point, sufficiently rapidly so as to avoid the precipitation of granular or blocky solid BHET, precipitate of high purity BHET free from the granular or blocky solids of BHET can be obtained as described in the foregoing items (C) and (D), even when thereafter the resultant slurry is gradually cooled.

The above phenomenon can be more tangibly explained as to the solubility curve of crude BHET in benzene as given in the graph of attached FIG. 1. That is, the benzene solution A of 120° C. or above, which consists of approximately 28.5 parts by weight of crude BHET per 100 parts by weight of benzene, is cooled with sufficient rapidity to a temperature at highest below the apparent melting point of the crude BHET in benzene, which is approximately 90° C. (point B in the same graph), for example, 80° C. as identified with point C on the graph, so as to avoid the formation of granular or blocky BHET, in accordance with the subject invention. The resulting benzene slurry, in which a part of BHET is precipitated, never yields solid BHET in which the granular or blocky BHET is mixed, regardless the subsequent manner of cooling, i.e., if quenched or gradually cooled.

The temperature to which the heated benzene solution is rapidly cooled, that is, the point C, can be optionally selected, so far as it is lower than 90° C., that is, the point B.

According to our views, when the cooling of the solution A from the initial high temperature (point A in the attached FIG. 1) to a temperature at highest below the temperature at point B is not performed at a sufficiently high rate, accompanying with the cooling from the point A to point B, the molten BHET is separated from the solution, forming a different phase, and such molten BHET is solidified into granular or blocky form as cooled to a temperature below the point B. And, because such solidified BHET still contains considerably large quantities of impurities, particularly HE-4CBA, it gives inferior polyethylene terephthalate when polymerized.

The quench or rapid cooling of the solution from the points A to B can be performed at any rate and any manner, so far as the aforesaid granular or blocky solid precipitate is not formed.

For instance, (1) the heated benzene solution of crude BHET of 120° C. as identified with point A of FIG. 1 is formed in a pressure vessel because the boiling point of benzene is 80° C. In order to quench the same solution to a temperature below point B, the pressure vessel may be opened so as to reduce its inside pressure rapidly to the atmospheric level. The pressure to which the vessel is opened, however, needs not be atmospheric but can be higher, so far as the temperature of the BHET slurry in benzene, which is formed upon the pressure release, becomes lower than the point B. Also the pressure may be less than the atmospheric.

(2) It is also permissible to introduce a large quantity of cooling liquid, or cooling slurry containing purified BHET, into the heated solution to quench the latter to a temperature below point B.

(3) Or, the said heated solution may be led into a large quantity of cooling liquid or above slurry.

The cooling liquid or slurry to be used in the above quenching methods (2) and (3) is not limited to specific substances so far as it is non-reactive with BHET. From such conveniences as easy recovery of the solvent and higher thermal economy, the same solvent as used in the solution is preferred. That is, in case of the heated solution A, benzene, or slurry formed of purified BHET as suspended in benzene, is preferred.

(4) A preferred quenching system in the invention comprises discharging the heated solution, for example, the solution A, into a low pressure zone wherein the pressure is lower than the saturated vapor pressure of the mixture which is formed when the heated solution is cooled to the apparent melting point of the crude BHET in that solvent. Whereby the heated solution is quenched from the high temperature to an optional temperature below the apparent melting point. With such a procedure, it is possible to quench the heated solution to the desired temperature, e.g., in case of the above heated soluton A, to a temperature below the point B, by very simple operation.

In the above method (4) the heated solution may be directly discharged into a vapor phase under a pressure lower than the above-specified pressure, or into a liquid phase under such low pressure. The vapor phase may be of air, an inert gas such as nitrogen or carbon dioxide, or of the vapor of the solvent used. Again as the liquid phase, any liquid which is inert to BHET is usable, but for the same reasons already mentioned, the same solvent as employed in the heated solution, or a solution or suspension thereof containing BHET, is preferred. The solvent of course may be cooled to a suitable temperature in advance. The low pressure zone may be suitably pressurized or left to be atmospheric, or may be of reduced pressure. In short, the essential requirement in this case is that the pressure of the low pressure zone must be maintained at a level lower than the saturated vapor pressure of the mixture of the BHET and solvent, the mixture being such that will be formed if the heated solution is cooled to the apparent melting point of the crude BHET in the same solvent. Furthermore, the pressure must be maintained at the low level through the discharge period of the heated solution into the low pressure zone. By so doing, for example, the heated solution A is rapidly cooled from the point A, i.e., 120° C., to a temperature lower than the point B, i.e., approximately 90° C., without causing precipitation of granular or blocky BHET. Furthermore, the slurry obtained by discharging the heated solution into the low pressure zone may be further cooled by optional means if desired.

Also in the foregong cooling method (3), if the pressure under which the heated solution is mixed with the cooling liquid or slurry, is either equal or slightly higher than the saturated vapor pressure of the mixture of identical composition with that of the heated solution, which would be formed when the heated solution is cooled to the apparent melting point of the crude BHET in the solvent, substantially equivalent and equally satisfactory result to that of the method (4) can be easily obtained.

After quenching the heated solution by any of the methods as described in (1)–(4), it is advantageous to let stand the quenched liquid generally for 1 minute to 10 hours, preferably 20 minutes to 3 hours, in order to fully precipitate BHET.

The crude BHET to be refined in accordance with the present invention is any of the products of the conventional methods as introduced in the beginning of this specification. Among the conventional products, however, particularly the crude BHET prepared by the ethylene oxide method normally shows low oligomers content, and therefore is most suitable to be refined by the subject process.

While any aromatic compound which is liquid at room temperature can be used as the purification solvent, so far as it is inert to BHET, those which show low dissolving ability of BHET at low temperature but exhibit high dissolving ability at higher temperatures, such as 100° C. or above, and furthermore which are thermally stable, are preferred. As such preferred aromatic compounds, for example, aromatic hydrocarbons such as benzene, toluene, xylene (ortho-, meta-, or para-), ethylbenzene, trimethylbenzene and cumene; and halogenated aromatic hydrocarbons such as monochlorobenzene, ortho, meta, or para-dichlorobenzene, etc., may be named, the most preferred being benzene and toluene. Particularly benzene is the optimum solvent for the purpose of this invention. Of course those aromatic compounds may be used as mixtures, however without any particular advantage.

According to the invention, a heated solution is prepared from the aforesaid crude BHET and the aromatic compound solvent which is liquid at room temperature. In that operation, it is important to form a solution containing the crude BHET as uniformly dissolved therein, at a concentration higher than the saturation solubility of the crude BHET in the solvent, at the temperature corresponding to the apparent melting point of the BHET to be purified in the same solvent, and to make the temperature of the solution higher than the apparent melting point.

The manner of operation and method of making such a heated solution are not critical. For example, some of the useful methods are as follows:

(1) all of the crude BHET charged is completely dissolved in the solvent by heating, to form the high temperature solution;
(2) crude BHET is dissolved in the solvent by heating, and the insoluble portion is removed to provide a homogeneous high temperature solution; or
(3) crude BHET is contacted with the solvent at a temperature above the melting point of the crude BHET, to form a homogeneous solution containing no insoluble matter.

In accordance with the subject invention, the heated solution of crude BHET in an aromatic compound which is liquid at room temperature as above-described is subjected to the quenching treatment, and after optional further cooling, whereby precipitated BHET is separated. Thus, BHET which is refined to a very high purity can be obtained with simple procedures.

According to a preferred embodiment of the invention, for example, when benzene is employed as the solvent, a homogeneous solution heated to a lowest 96° C., which consists of 8-60 parts by weight of crude BHET and 100 parts by weight of benzene is directly discharged into benzene, or solution or suspension formed of benzene and BHET, of a pressure not higher than 2 kg./cm.$^2$ as an absolute pressure, preferably below 1.3 kg./cm.$^2$, and of a temperature not exceeding 90° C., and either directly from the resultant system or after further cooling the system, the BHET precipitated is separated and recovered. Thus high purity BHET can be obtained very smoothly.

Again, when toluene is used as the solvent, 40-60 parts by weight of crude BHET per 100 parts by weight of toluene is used, and a homogeneous solution is formed by heating the two at a temperature not lower than 98° C. The solution is directly discharged into toluene, or a solution or suspension formed of toluene and BHET, of a pressure not higher than 1.5 kg./cm.$^2$ as an absolute pressure, preferably not higher than 500 mm. Hg, and of a temperature below 91° C., and the BHET precipitated is separated and recovered either directly from the resultant suspension, or from the suspension which has been further cooled. Thus, similarly high purity BHET is obtained with smooth procedures.

The dissolving of crude BHET in the solvent is performed under the heating of preferably not higher than 200° C., inter alia, not higher than 180° C. Whereby the deterioration in the quality of BHET during the preparation of heated solution can be effectively prevented.

According to the invention, the above-described refining may be repeated twice or more number of times. Also the refining can be preformed either continuously or batchwise.

Generally for making high melting point, substantially coloration-free polyethylene terephthalate by polymerization of refined BHET, it is desirable that the HE-4-CBA, HE-PTA and Φ-DEG contents of the BHET should be as little as possible. According to our experiments, satisfactory polyethylene terephthalate can be obtained when HE-4CBA content is no more than 600 p.p.m.; HE-PTA content, no more than 0.5 wt. percent. It is possible to produce the refined BHET of the impurities contents less than the above-specified values with ease, by suitably practicing the purification method of the present invention.

Also the purification efficiency of recrystallization process from solvent can be evaluated by distribution coefficient of the impurity, which is expressed by the equation below.

Distribution coefficient
$$= \frac{\text{Impurity concentration in the precipitated BHET}}{\text{Impurity concentration in the filtrate}}$$

According to the invention, the above distribution coefficient is no more than 2.5 concerning HE-4CBA, no more than 1.0 concerning HE-PTA, and no more than 8 concerning DEG. Thus generally those impurities are effectively transferred into the filtrate side and removed. Accordingly the purification method of this invention exhibits very high elimination efficiency of those impurities.

EXAMPLE 1

A 200-cc. capacity glass pressure bottle equipped with an electromagnetic rotatory stirrer was charged with 25.1 g. of crude BHET obtained by reacting terephthalic acid with ethylene oxide and 170 cc. of benzene, and inside pressure thereof was raised to 4 kg./cm.$^2$G by nitrogen supply. This pressure bottle was connected in advance with a 500-cc. capacity glass flask equipped with a vacuum jacket, reflux condenser, and a stirrer (hereinafter this flask will be referred to as the "flash tank," by means of a stainless steel pipe mounted with a valve, which was connecting the bottom of the pressure bottle to side of the flash tank. The flash tank was in advance charged with 150 cc. of BHET-benzene slurry boiling under atmospheric pressure (1.94 g. BHET/100 g. benzene), and the whole set of the apparatus including the pressure bottle and flash tank was immersed in an oil bath of 115° C., in order to dissolve the charged BHET. The content of the pressure bottle was stirred, and after complete dissolving of the charged BHET was confirmed, the valve on the pipe connecting the bottom of the pressure bottle with the flash tank was opened, so that the benzene solution of BHET in the pressure bottle was transferred into the boiling slurry in the flash tank under atmospheric pressure.

In the meantime, the temperature in the tank was maintained at 80.7° C., and the pressure, atmospheric. When the solution in the pressure bottle was completely transferred, the valve was closed and the apparatus was withdrawn from the oil bath. The pressure bottle was again charged with the same crude BHET and benzene under same conditions, and the slurry in the flash tank of the quantity corresponding to that increased by the foregoing operation was withdrawn from the system as the sample. Whereupon the apparatus was again immersed in the oil bath. Thus the similar operation was repeated seven times. The slurry obtained in each run as the sample was immediately filtered, and the cake was washed with cold benzene and dried. The resultant purified BHET contained no blockly or granular solid BHET, but consisted mainly of flaky crystals. The analysis results of the uniformized sample, and contents and distribution coefficients of the impurities were as follows:

Impurities contents in the starting crude BHET:

HE-4CBA—2.820 p.p.m.
HE-PTA—355 p.p.m.
DEG—1.24 wt. percent

|  | Repetitive run number | | | | |
|---|---|---|---|---|---|
|  | 1 | 2 | 4 | 6 | 7 |
| Concentration of slurry in flash tank (wt. percent) | 8.45 | 10.1 | 11.5 | 11.2 | 11.4 |
| Impurities contents of purified BHET: | | | | | |
| HE-4CBA (p.p.m.) | 115 | 126 | 216 | 246 | 212 |
| HE-PTA (p.p.m.) | ≑0 | ≑0 | ≑0 | ≑0 | ≑0 |
| DEG (wt. percent) | 0.337 | 0.402 | 0.412 | 0.432 | 0.405 |
| Distribution coefficient: | | | | | |
| HE-4CBA | 0.264 | 0.315 | 0.484 | 0.538 | 0.439 |
| HE-PTA | ≑0 | ≑0 | ≑0 | ≑0 | ≑0 |
| DEG | 2.86 | 3.59 | 2.88 | 3.40 | 3.05 |

In the above experiment, the recovery ratio of the purified BHET was 76%.

The measurement of the DEG content in BHET in the present example was made as follows. Tetraethylene glycol dimethylether (0.010 gr.) is put into a sealed tube with 0.500 gr. of BHET and 1.0 ml. of dehydrated and rectified ethanol used as internal standard substances. The ethanol decomposed product obtained by heating for 8 hours at 230° C. was quantitatively analyzed by gas-chromatogram using a PEG (polyethylene glycol) 20 M column with a height of 1 m. This is the same in the following examples and controls.

EXAMPLE 2

A 50-liter capacity stainless steel pressure vessel equipped with a stirrer, heating jacket, and sight glass was charged with 7 kg. of the crude BHET prepared in the manner similar to Example 1, and 32 kg. of benzene, and its inside pressure was raised to 4 kg./cm.$^2$ G by introduction of nitrogen gas. Thereafter the system was heated to 110° C., and stirred for 30 minutes. Thereafter the undissolved matter in the system which settled when the stirring was stopped was removed. Then the solution was supplied into the liquid phase portions in a stainless steel flash tank equipped with a reflux condenser and a stirrer, which was charged in advance with 7 liters of boiling benzene. The slurry formed in the flash tank was continuously withdrawn from the system, and in the meantime the temperature inside the flash tank was maintained at 80.7° C. Thus obtained slurry was separated into solid and liquid, and the cake was washed with cold benzene and dried. Thus purified BHET contained absolutely no blocky or granular solid BHET.

The analysis results of the starting crude BHET and purified product thereof were as follows:

Starting crude BHET:
  HE–4CBA content—1,750 p.p.m.
  Optical density—0.130
Purified BHET:
  HE–4CBA content—150 p.p.m.
  Optical density—0.030
HE–4CBA distribution coefficient—0.66
Recovery ratio of purified BHET—86.20%

In the above and subsequent examples, the optical density was measured as to 25 cc. of the solution formed by dissolving 1 g. of the sample BHET in 14% aqueous ammonia, which was put in a 5-cm. long cell, at the wave length of 380 m$\mu$.

EXAMPLE 3

The slurry of 80.7° C. as obtained in Example 2 was let stand to cool off to approximately 25° C. as it was, and the resulting slurry was treated in the manner identical with Example 1. The results were as follows:

Purified BHET:
  HE–4CBA content—150 p.p.m.
  Optical density—0.045
HE–4CBA distribution coefficient—0.66
Recovery ratio of purified BHET—98.17%

EXAMPLE 4

The slurry of 80.7° C. as obtained in Example 2 was continuously thrown into benzene of 37° C., and the resultant slurry was indirectly cooled with a cooling medium so that the inside of the low temperature crystallization vessel should be maintained at 37° C. The resulting slurry was treated in the manner identical with Example 1, with the following results.

Purified BHET:
  HE–4CBA content—290 p.p.m.
  Optical density—0.068
HE–4CBA distribution coefficient—1.32
Recovery ratio of purified BHET—98.09%

EXAMPLE 5

In this example, the same apparatus as employed in Example 1 was used. The pressure bottle was charged with 25.1 g. of crude BHET and 170 cc. of toluene, and nitrogen gas was introduced thereinto to provide a pressure of 4 kg./cm.$^2$ G. The flash tank was charged with 150 cc. of a slurry formed of BHET and toluene (1.94 g. BHET/100 g. toluene) and pressure therein was controlled to be always 310 mm. Hg abs. The slurry was boiled under that pressure at 85° C. The whole set of the apparatus including the pressure bottle and flash tank was immersed in an oil bath of 147° C. Whereupon the stirring in the pressure bottle was started, and when the BHET dissolved completely in the toluene in the pressure bottle, the valve on the pipe connecting the bottom of the pressure bottle with the flash tank was opened. Whereby the toluene solution of BHET was transferred into the boiling slurry under reduced pressure in the flash tank. In the meantime, the pressure and temperature inside the flash tank were maintained substantially at 310 mm. Hg abs. and 85° C., respectively. When the solution in the pressure bottle was completely transferred, the subsequent treatments as in Example 1 were repeated.

Thus obtained purified BHET contained no blocky or granular solid BHET, but consisted mainly of crystalline flakes thereof. The analysis results of the uniformized sample thereof, and contents as well as distribution coefficient of the impurities were as follows:

Impurities contents in the starting crude BHET:

HE–4CBA—1980 p.p.m.
HE–PTA—250 p.p.m.
DEG—1.05 wt. percent.

|  | Repetitive run number | | | | |
| --- | --- | --- | --- | --- | --- |
|  | 1 | 2 | 3 | 4 | 7 |
| Concentration of slurry in flash tank (wt. percent) | 7.21 | 7.30 | 9.26 | 10.7 | 12.7 |
| Impurities contents of purified BHET: | | | | | |
| HE–4CBA (p.p.m.) | 391 | 425 | 540 | 567 | 537 |
| HE–PTA (p.p.m.) | 2.10 | 15.4 | 9.49 | 17.1 | 6.32 |
| DEG (wt. percent) | 0.470 | 0.485 | 0.622 | 0.594 | 0.536 |
| Distribution coefficient: | | | | | |
| HE–4CBA | 1.64 | 1.53 | 2.20 | 2.23 | 2.00 |
| HE–PTA | 0.1 | 0.7 | 0.4 | 0.6 | 0.3 |
| DEG | 3.98 | 4.10 | 6.54 | 6.27 | 5.90 |

The recovery ratio of the purified BHET was 75.5%.

EXAMPLE 6

Example 1 was repeated except that the flash tank was left empty, and the benzene solution of BHET in the pressure bottle was transferred into the flash tank through a vapor phase which was maintained at the boiling point of benzene under atmospheric pressure. The results were as follows:

HE–4CBA content of starting crude BHET—3,190 p.p.m.
HE–4CBA content of purified BHET—606 p.p.m.
HE–4CBA distribution coefficient—1.63
Recovery ratio of purified BHET—77%

EXAMPLE 7

The same apparatus as employed in Example 1, in which a 200-cc. capacity glass pressure bottle and 500-cc. capacity flash tank were combined, was employed. The pressure bottle was charged with 39.1 g. of crude BHET and 135 g. of benzene (BHET concentration: 22.5 wt. percent, and the flash tank was charged with 120 g. of benzene alone. The temperature in the glass pressure bottle was maintained at 125° C., and that in the flash tank, 80° C., i.e., the boiling point of benzene. Upon complete dissolving of the crude BHET in benzene in the glass pressure bottle, the homogeneous solution was poured into the flash tank in the manner as described in Example 1. The operation pressure was 5 kg./cm.$^2$G in the pressure bottle, and atmospheric in the flash tank. The slurry containing the crystalline precipitate in the flash tank was stirred for 30 minutes at 80.5° C., filtered at the same temperature, and the recovered cake was immediately washed with cold benzene. The results of this experiment was as follows:

Starting crude BHET:
    HE–4CBA content—2,660 p.p.m.
    HE–PTA content—480 p.p.m.
    DEG content—1.250 wt. percent
Crystalline cake:
    HE–4CBA content—280 p.p.m.
    HE–PTA content—≑0 (below detectable densitivity)
    DEG content—0.463 wt. percent
Distribution coefficient:
    HE–4CBA—0.79
    HE–PTA—≑0
    DEG—4.28

EXAMPLE 8

Employing the same apparatus as used in Example 1, the glass pressure bottle was charged with 54.0 g. of BHET and 120 g. of benzene (BHET concentration 31.0 wt. percent, and the flash tank was charged with 350 g. of benzene alone. The temperature in the pressure bottle was maintained at 134° C., and that of the flash tank, 80° C. Upon homogeneous dissolving of the crude BHET in benzene in the pressure bottle, the homogeneous solution was poured into the benzene in the flash tank, in the manner described in Example 1. The operation pressure was 5 kg./cm.$^2$G in the pressure bottle, and atmospheric in the flash tank. The slurry containing the crystalline precipitate was stirred for 30 minutes at 80.5° C., and thereafter filtered at the same temperature. The cake was immediately washed with cold benzene. The result of this experiment was as follows:

Starting crude BHET:
    HE–4CBA content—2,660 p.p.m.
    HE–PTA content—480 p.p.m.
    DEG content—1.250 wt. percent
Crystalline cake:
    HE–4CBA content—186 p.p.m.
    HE–PTA content—3.5 p.p.m.
    DEG content—0.441 wt. percent
Distribution coefficient:
    HE–4CBA—0.845
    HE–PTA—≑0.1
    DEG—5.53

EXAMPLE 9

In the same apparatus as employed in Example 1, the glass pressure bottle was charged with 35.2 g. of crude BHET and 52.5 g. of benzene (BHET concentration: 40.2 wt. percent), and the flash tank was charged with 250 g. of benzene. The inside of the pressure bottle was maintained at 140° C. and 5 kg./cm.$^2$ G, and that of the flash tank, at 80° C. under atmospheric pressure. Upon homogeneous dissolving of the BHET in benzene in the pressure bottle, the homogeneous solution was poured into the benzene in flash tank, by opening the valve between the pressure bottle and flash tank as described in Example 1. The slurry containing the crystalline precipitate in the flash tank was stirred for 30 minutes, and thereafter filtered at 80.5° C. The cake was washed with cold benzene. The result of the experiment was as follows:

Starting crude BHET:
    HE–4CBA content—2,660 p.p.m.
    HE–PTA content—480 p.p.m.
    DEG content—1.250 wt. percent
Crystalline cake:
    HE–4CBA content—183 p.p.m.
    HE–PTA content—8.0 p.p.m.
    DEG content—0.438 wt. percent
Distribution coefficient:
    HE–4CBA—0.889
    HE–PTA—≑0.2
    DEG—5.96

EXAMPLE 10

Fifteen (15) parts by weight of crude BHET formed by reacting crude terephthalic acid with ethylene oxide, and which contained 1,980 p.p.m. of HE–4CBA was completely dissolved in 100 parts by weight of monochlorobenzene at 120° C. One-hundred (100) g. of the solution was continuously fed into a flask equipped with a stirrer, which was charged with 50 g. of 60° C. monochlorobenzene. In the meantime, normal temperature monochlorobenzene was continuously dropped into the flask to prevent the rise of its inside temperature to above 80° C. Thus, by the time the supplying of 100 g. of monochlorobenzene solution of BHET completed, 50 g. of the normal temperature monochlorobenzene was dropped. Thereafter the system was gradually cooled to the room temperature.

Thus obtained slurry was separated into solid and liquid, and the solid cake was washed with cold monochlorobenzene. The thereafter dried, purified BHET had a HE–4CBA content of 250 p.p.m., and the HE–4CBA distribution coefficient was 2.1.

EXAMPLE 11

In the same apparatus as employed in Example 1, the glass pressure bottle was charged with 25.1 g. of BHET and 150 g. of benzene (BHET concentration: 14.3 wt. percent, and the flash tank was charged with 250 g. of benzene. The inside of the pressure bottle was maintained at 4 kg./cm.$^2$ G and 123° C., and that of the flash tank, at a reduced pressure (degree of vacuum: 380 mm. Hg) and 60° C. Upon complete dissolving of the crude BHET in benzene in the pressure bottle, the homogeneous solution was poured into the benzene in flash tank, by opening the valve on the pipe connecting the pressure bottle with flash tank as described in Example 1. Thus formed slurry containing the crystalline precipitate was stirred for 20 minutes. Thereafter the pressure in the flash tank was returned to the atmospheric, and simultaneously therewith, the apparatus including the glass pressure bottle and flash tank was withdrawn from the oil bath. The slurry was filtered at 60° C., and the solid cake was immediately washed with cold benzene. The result of this experiment was as follows:

Starting crude BHET:
    HE–4CBA content—1,980 p.p.m.
    HE–PTA content—380 p.p.m.
    DEG content—1.154 wt. percent Crystalline cake:
    HE–4CBA content—190 p.p.m.
    HE–PTA content—9.3 p.p.m.
    DEG content—0.489 wt. percent Distribution coefficient:
    HE–4CBA—1.57
    HE–PTA—≑0.4
    DEG—12.1

EXAMPLE 12

The glass pressure bottle in the apparatus employed in Example 1 was replaced by a 200-cc. capacity, metallic pressure vessel, which was similarly equipped with a stirrer and connected to the flash tank by means of a pipe. The pressure vessel was charged with 25.1 g. of crude BHET and 150 g. of benzene (BHET concentration: 14.3 wt. percent) and the flash tank was charged with 250 g. of benzene. The inside of the metallic pressure vessel was maintained at 6 kg./cm.$^2$ G and 150° C., and that of the flash tank, at atmospheric pressure and 80° C. It had been confirmed in advance that the crude BHET of the same composition to that charged in the pressure vessel was homogeneously soluble in benzene at 150° C., by an experiment in a sealed tube. In the practice of this example, an ample dissolving time was allowed, and the resulting homogeneous solution was poured into the benzene in flash tank, by opening the valve between the metallic pressure vessel and flash tank. Thus formed slurry containing the crystalline precipitate in the flash tank was stirred for 30 minutes, and thereafter filtered at 80.5° C. The cake was washed with cold benzene. The result of this experiment was as follows:

Starting crude BHET:
  HE–4CBA content—4,440 p.p.m.
  HE–PTA content—843 p.p.m.
  DEG content—1.286 wt. percent Crystalline cake:
  HE-4CBA content—161 p.p.m.
  HE-PTA content—3 p.p.m.
  DEG content—0.280 wt. percent
Distribution coefficient:
  HE-4CBA—0.775
  HE-PTA—≐0.1
  DEG—5.24

EXAMPLE 13

In the same apparatus as employed in Example 12, the metallic pressure vessel was charged with 25.1 g. of crude BHET and 150 g. benzene (BHET concentration: 14.3 wt. percent) and the flash tank was charged with 250 g. of benzene. The inside of the pressure vessel was maintained at 10 kg./cm.$^2$G and 170° C., and that of the flash tank, at the atmospheric pressure and 80° C. It had been confirmed in advance that the particular BHET charged in the pressure vessel was homogeneously soluble in benzene at 170° C. After taking an ample dissolving time, the resultant homogeneous solution was poured into the flash tank by opening the valve between the metallic pressure vessel and flash tank. Thus formed slurry containing the crystalline precipitate was stirred for 30 minutes, and thereafter filtered. The cake was washed with cold benzene. The result of this experiment was a follows:

Starting crude BHET:
  HE-4CBA content—4,440 p.p.m.
  HE-PTA content—843 p.p.m.
  DEG content—1.286 wt. percent
Crystalline cake:
  HE-4CBA content—183 p.p.m.
  HE-PTA content—3.5 p.p.m.
  DEG content—0.326 wt. percent
Distribution coefficient:
  HE-4CBA—0.855
  HE-PTA—≐0.1
  DEG—6.18

EXAMPLE 14

7.2 parts by weight of crude BHET, which was obtained by reacting crude terephthalic acid with ethylene oxide and had a HE-4CBA content of 1,980 p.p.m., was completely dissolved in 100 parts by weight of xylene at 130° C. One-hundred (100) g. of this solution was continuously supplied into a flask equipped with a stirrer, which was in advance charged with 50 g. of 60° C. xylene. In the meantime, normal temperature xylene was continuously dropped into the sytem so as to prevent the temperature in the flask from exceeding 80° C. Thus, by the time the continuous supply of 100 g. of xylene solution of BHET completed, 60 g. of the normal temperature xylene was dropped. Thus obtained slurry was separated into solid and liquid, and the cake was washed with cold xylene. Thereafter dried, purified BHET had a HE-4CBA content of 160 p.p.m., and the HE-4CBA distribution coefficient was 2.3.

EXAMPLE 15

Figure 2:
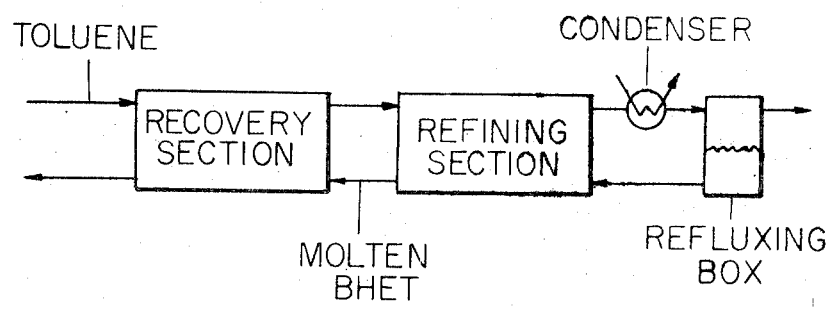

In the extraction apparatus consisting of recovery section (mixer-settler-3 vessels), refining section (mixer-settler-8 vessels), a condenser and a refluxing box, as illustrated by the FIG. 2, the recovery and refining sections were maintained at 105° C., and the reflux box, at 100° C. From one end of the recovery section, 100 parts by weight per unit time of pre-heated toluene was continuously supplied, and from the other end of the recovery section, molten crude BHET obtained by reacting crude terephthalic acid with ethylene oxide (HE-4CBA content: 2,900 p.p.m., HE-PTA content: 480 p.p.m., DEG content: 1.3 wt. percent, optical density: 0.195) was continuously supplied at a rate of 7.5 parts by weight per unit time. The toluene solution in which the BHET was dissolved at 105° C. as obtained in the refining section was cooled to 100° C. by the condenser, and from which a part of BHET was molten and separated. This molten BHET phase was settled from toluene phase in the refluxing box, returned to the refining section, and refluxed. Thus the toluene phase and molten BHET phase were continuously contacted countercurrently in the refining section. The toluene phase separated from the molten BHET phase at the refluxing box was continuously withdrawn from the system. Thereafter the total toluene was removed, and the resultant dry cake was treated in the same manner as in Example 1. The yield of the dry cake was 5 parts per 100 parts of the toluene employed, the parts being by weight.

This purified BHET had a HE-4CBA content of 240 p.p.m., HE-PTA content of 5.4 p.p.m., DEG content of 0.408 wt. percent, and an optical density of 0.021.

This BHET and 0.027 mol percent thereof of antimony trioxide were put in a polymerization vessel, and after nitrogen substitution of its inside atmosphere, immersed in an oil bath of 285° C. After 30 minutes of polymerization under atmospheric pressure, the pressure inside the vessel was gradually reduced to no higher than 1 mm. Hg consuming 30 minutes. The polymerization in the vacuum was continued for additional 60 minutes. Thus 2 hours after immersion in the oil bath, the polymerization was terminated by nitrogen gas introduction into the vessel. The resulting polymer exhibited excellent properties as indicated below.

[$\eta$]: 0.651
S.P.: 262.4° C.
Color tone: L=84.5, a=−0.4, b=−3.5
[COOH]: 15.1 eq./10$^6$ g.

In the above, [$\eta$] is the intrinsic viscosity of the polyester measured at 35° C. with the use of orthochlorophenol as the solvent. S.P. stands for softening point of the polyester, and the 1, a and b used as the norms of color tone are the readings on color-difference meter, in accordance with the indication method designated in ASTM 1482–57T.

Control 1

Crude BHET and benzene were charged in the glass pressure bottle under the identical conditions with those employed in Example 1, and immersed in an oil bath of 115° C. The content was stirred to cause complete dissolving of the BHET in benzene. After formation of a homogeneous solution, the system was maintained at a constant temperature for 5 minutes under stirring. Thereafter the stirring was stopped, and the oil bath was cooled at a rate of 2° C./min. When it reached 80° C., the cooling was stopped, and the content in the pressure bottle was maintained at that temperature for 30 minutes, and subsequently withdrawn from the bottle, to be treated similarly to Example 1. The result is given below.

Starting crude BHET:
  HE-4CBA content—2,820 p.p.m.
  HE-PTA content—610 p.p.m.
  DEG content—1.24 wt. percent
Purified BHET:
  HE-4CBA content—1,330 p.p.m.
  HE-PTA content—232 p.p.m.
  DEG content—1.074 wt. percent
Distribution coefficient:
  HE-4CBA—4.8
  HE-PTA—3.4
  DEG—21.2

Control 2

Crude BHET and benzene were charged in the pressure bottle and immersed in an oil bath of 89° C. The content of the bottle was stirred to cause complete dissolving of crude BHET in the benzene. Five minutes after formation of the homogeneous solution, the oil bath was cooled at a rate of 2°–2.5° C./min. while the stirring was continued. At 67° C., the cooling was stopped, and the system was left under that state for 30 minutes. The content in the pressure bottle was withdrawn and treated as in Example 1. The result was as indicated below.

Starting crude BHET:
  HE-4CBA content—3,270 p.p.m.
  HE-PTA content—1,210 p.p.m.
  DEG content—1.238 wt. percent
Purified BHET:
  HE-4CBA content—164 p.p.m.
  HE-PTA content—37 p.p.m.
  DEG content—0.490 wt. percent
Distribution coefficiency:
  HE-4CBA—1.50
  HE-PTA—0.82
  DEG—19.0

Control 3

Seventy (70) g. of benzene and 12 g. of crude BHET prepared similarly to Example 1 (HE-4CBA content: 2,800 p.p.m., HE-PTA content: 510 p.p.m., DEG content: 1.3 wt. percent) were charged in the glass pressure bottle, and heated to 120° C. in an oil bath under stirring, until the BHET was completely dissolved in benzene. Then the system temperature was dropped by the rate of 2° C./min., down to 50° C. Then the content was withdrawn from the pressure bottle, and separated into solid and liquid. The cake was washed with cold benzene. The cake was composed of blocky BHET which was solidified through a molten stage as the solution was cooled, and flaky crystals which were directly precipitated from the solution at below the melting point. Separating the two after drying the cake, 7 g. of blocky, solid BHET and 4.5 g. of flaky, crystalline BHET were obtained. The impurities contents of the two products were as follows:

| Form of purified BHET | HE-4CBA (p.p.m.) | HE-PTA (p.p.m.) | DEG (wt. percent) |
| --- | --- | --- | --- |
| Blocky BHET | 1,600 | 240 | 1.19 |
| Flaky BHET | 450 | 13 | 0.62 |

Control 4

Control 1 was repeated except that the cooling was performed while the content in the pressure bottle was stirred. The product consisted of granular BHET and flaky, crystalline BHET. The mixture was separated into the two types of products and analyzed respectively. The results were as given in the table below.

| Form of purified BHET | HE-4CBA content (p.p.m.) | HE-PTA content (p.p.m.) | DEG content (wt. percent) |
| --- | --- | --- | --- |
| Granular BHET | 1,180 | 160 | 1.08 |
| Flaky BHET | 490 | 16 | 0.71 |

Control 5

In the same apparatus as employed in Example 1, the pressure bottle was charged with 25.1 g. of crude BHET (HE-4CBA content: 1,980 p.p.m.) and 170 cc. of toluene, and nitrogen gas was introduced into the bottle to provide a pressure of 4 kg./cm.$^2$/G. The flash tank was charged in advance with 150 cc. of a slurry formed of BHET and toluene (1.94 g. BHET/100 g. toluene), which was boiling under atmospheric pressure. In that state, the entire quantity of the BHET charged was dissolved in the toluene. The entire apparatus including the pressure bottle and flask tank was then immersed in an oil bath of 147° C., and the stirring in the pressure bottle was started. When the BHET was completely dissolved in toluene in the pressure bottle, the valve on the pipe connecting the bottom of the pressure bottle to the flash tank was opened, and the toluene solution of BHET was poured into the boiling benzene in the flask tank. In the meantime, the temperature of the flask tank was maintained at 111° C. When the pressure bottle was emptied, the same subsequent procedures as described in Example 1 were repeated, in repetitive run numbers as in Example 1.

The sample withdrawn from the flash tank consisted of toluene phase and BHET phase, which was gradually cooled to room temperature under stirring. Thus formed slurry was separated into solid and liquid. The cake was washed with cold toluene and dried. The product was a mixture of granular solid BHET and flaky, crystalline BHET, and had a 4-CBA content of 980 p.p.m.

Control 6

Seventeen (17) parts by weight of the toluene-treated BHET which was obtained in Example 15 was charged in the pressure vessel together with 100 parts by weight of benzene, and completely dissolved in the benzene at an elevated temperature of 120° C. Thereafter the system was cooled to 60° C. at a rate of 5° C./min., followed by separation into solid and liquid phases. The solid cake was washed with cold benzene and dried. When the product was polymerized under the same conditions as employed in Example 15, the following result was obtained.

[$\eta$]: 0.648
S.P.: 259.2° C.
Color tone: L=83.9, $a$=−0.5, $b$=5.8
[COOH]: 16.2 eq./10$^6$ g.

This polymer was heavily yellowed and unsatisfactory for any practical use.

We claim:
1. A process for the purification of crude bis-($\beta$-hydroxyethyl)terephthalate prepared by reacting terephthalic acid with ethylene glycol or ethylene oxide or by reacting dimethyl terephthalate with ethylene glycol which comprises (a) preparing a solution of said crude bis-($\beta$-hydroxyethyl terephthalate uniformly dissolved in an aromatic compound solvent which is liquid at room temperature at a concentration higher than the saturation solubility of the crude bis-($\beta$-hydroxyethyl) terephthalate in the solvent at the temperature corresponding to the apparent melting point of the same crude bis-($\beta$-hydroxyethyl) terephthalate in the same solvent at an elevated temperature above said apparent melting point, and (b) rapidly cooling the solution of (a) to a temperature below the apparent melting point, so as to avoid the precipitation of granular or blocky solids of the bis-($\beta$-hydroxyethyl) terephthalate.

2. The process of claim 1, wherein the aromatic compound solvent is selected from the group consisting of benzene, toluene and xylene.

3. The process of claim 1, wherein the solution is discharged into a low pressure zone under a pressure lower than the saturated vapor pressure of the mixture resulting from cooling the heated solution to the apparent melting point of the crude bis-($\beta$-hydroxyethyl)terephthalate in the same solvent, in the cooling step (b), and whereby the heated solution is quenched from the initial temperature to a temperature below the apparent melting point.

4. The process of claim 3, wherein the low pressure zone consists of the identical solvent with that which is employed in the heated solution, or of a liquid mixture of the same solvent with bis-($\beta$-hydroxyethyl)terephthalate, and the heated solution is directly discharged into that solvent or liquid mixture.

5. The process of claim 1 in which the crude bis-($\beta$-hydroxyethyl)terephthalate is that obtained by the reaction of terephthalic acid with ethylene oxide.

6. The process of claim 1, wherein a homogeneous solution consisting of 8–60 parts by weight of crude bis-($\beta$-hydroxyethyl)terephthalate and 100 parts by weight of benzene, which is heated to at lowest 96° C., is directly discharged into benzene, or a solution or suspension formed of benzene and bis-($\beta$-hydroxyethyl)terephthalate, of a pressure not higher than 2 kg./cm.$^2$ as an absolute pressure, and of a temperature not exceeding 90° C.

References Cited
UNITED STATES PATENTS

| | | | |
|---|---|---|---|
| 3,268,575 | 8/1966 | Keck | 260—475 |
| 3,461,154 | 8/1969 | Lafont et al. | 260—475 |

OTHER REFERENCES

Weissberger: Technique of Organic Chemistry, III, part I, pp. 433–435 (1956).

LORRAINE A. WEINBERGER, Primary Examiner

E. J. SKELLY, Assistant Examiner